No. 644,141. Patented Feb. 27, 1900.
H. W. MEINERT.
THRESHING MACHINE.
(Application filed May 29, 1899.)
(No Model.)
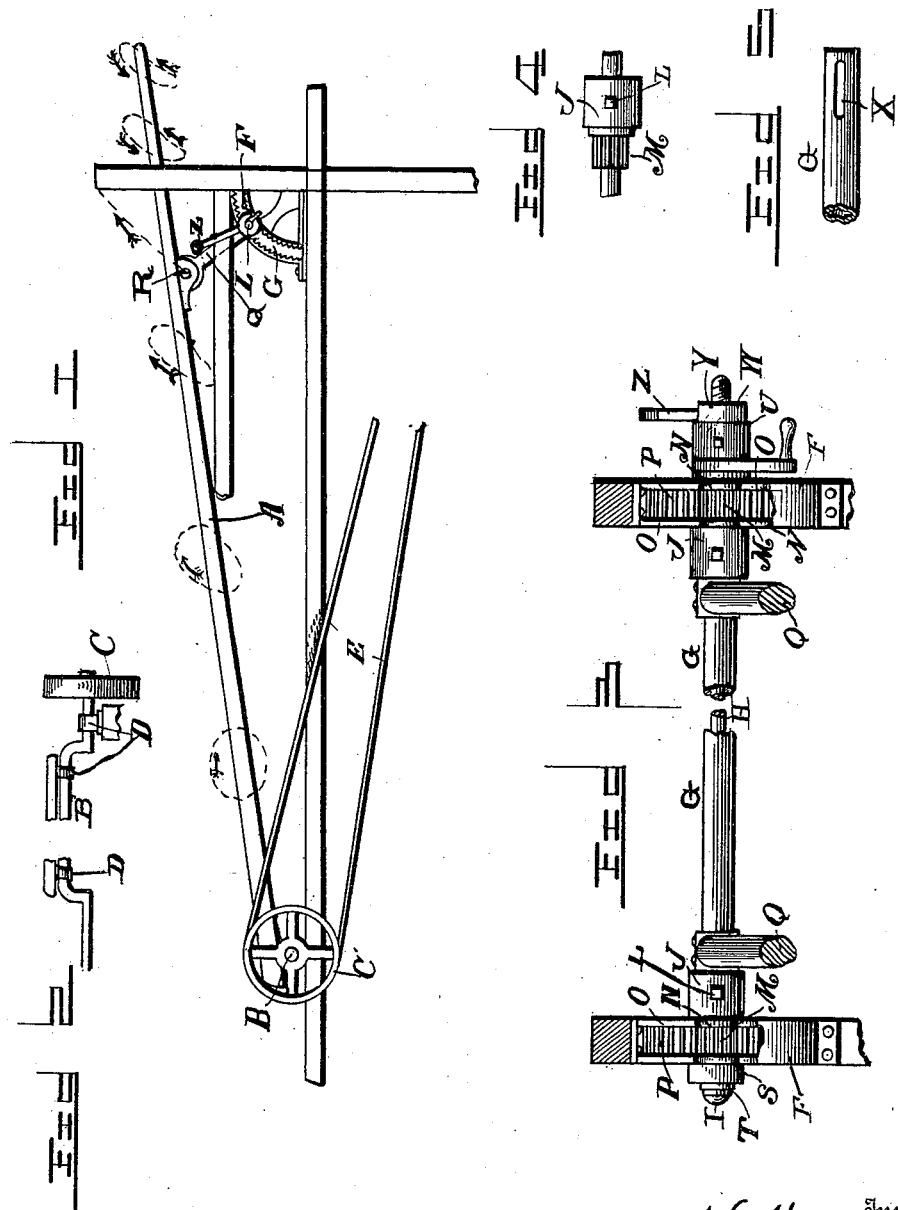

UNITED STATES PATENT OFFICE.

HENRY W. MEINERT, OF DIXON, IOWA.

THRESHING-MACHINE.

SPECIFICATION forming part of Letters Patent No. 644,141, dated February 27, 1900.

Application filed May 29, 1899. Serial No. 718,704. (No model.)

*To all whom it may concern:*

Be it known that I, HENRY W. MEINERT, a citizen of the United States, residing at Dixon, in the county of Scott and State of Iowa, have invented certain new and useful Improvements in Threshing-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in threshing-machines; and it consists in a straw-rack, pivoted at one end upon a cranked operating shaft, and which imparts to the rack its necessary movement, combined with supporting-arms loosely attached to the rack near its outer end, and a suitable mechanism connected with the lower ends of these supporting-arms, whereby the amount of throw or movement of the outer end of the rack can be increased or diminished at will, as will be more fully described hereinafter.

The object of my invention is to produce a mechanism by means of which the straw-rack is given a different motion from that which has been imparted to it heretofore in threshing-machines and which movement is merely rotary at the inner end of the rack, but is gradually transformed into a movement rather vertical than rotary, so as to give an increased shaking power to the rack at its outer end, and thus produce an agitation which is sufficient under all circumstances to separate the grain from the straw, even if the straw is damp and heavy.

In the accompanying drawings, which represent my invention, Figure 1 is a side elevation of a straw-rack to which my invention is applied. Fig. 2 is a detail view showing the inner end of the rack pivoted upon the cranked driving-shaft. Fig. 3 is an enlarged detail view showing the parts secured together. Fig. 4 is a detail view of one of the toothed collars, and Fig. 5 is a detail view showing the slotted end of the sleeve.

A represents an ordinary straw-rack, which has its inner end pivoted to the cranked operating-shaft B, provided with the driving-pulley C upon one end, by means of suitable rings or eyes D. This shaft B is operated through the wheel C', by means of the belt E, in the usual manner, and the motion imparted to the inner end of the rack by the shaft B is merely a rotary one, as shown by the dotted lines.

To the frame of the threshing-machine upon both sides are secured segmental racks F, which are provided with two rows of teeth which are set opposite to and facing each other, as shown, and extending through one side of the frame to the other and passing through the curved toothed slots in the segments F is the sleeve G and the clamping-rod H, provided with an enlarged head I at one end. Upon the sleeve G, inside of each of the segments F, is secured a sleeve J by means of a set-screw L, and each of which sleeves is provided with teeth M to engage with the teeth upon the segments F. These sleeves inside of the toothed portions M are provided with the smooth bearing-shoulders N, which bear upon corresponding smooth bearing-surfaces O in the segments for the purpose of relieving the wear and strain upon the teeth P of the segments and these move the collars, so as to prevent them from becoming injured and also for the purpose of enabling the parts to be clamped more securely in position by means of the clamping-rod H than would otherwise well be done. Loosely attached to the sleeve G are the lower ends of the supporting-arms Q, which serve to support the outer ends of the rack A, and which supporting-arms have their upper ends loosely connected to the under side of the rack by means of a shaft or rod R.

Upon that end of the rod H which is provided with the enlarged head I is placed a collar S, which is also provided with a reduced portion, so as to bear upon the bearing-surfaces O upon one of the segments, and between the head of the rod H and this collar S may be placed a washer T. Upon the opposite end of the sleeve G from the collar S is secured a laterally-adjustable collar U, which is also provided with a bearing-surface N, and which collar U has a handle V applied thereto, so that the entire sleeve and its attachment can be made to revolve, and by being revolved the teeth M of the collars J through engagement with the teeth P upon the segments F can be made to raise and lower supporting-arms Q and through them the outer end of the rack A. This adjustable collar U is secured to the outer end of the sleeve G by means of a set-screw W, which catches in a slot X in the end of the sleeve and which slot permits the collar to be moved outwardly upon the sleeve for the purpose of loosening or tightening the parts in relation to the segments; but the sleeve G and the collar U are caused to revolve together by the set-screw W, which has its end to catch in the slot. Upon the outer screw-threaded end of the clamping-rod H is placed a nut Y, which is provided with a handle Z as a matter of convenience. When the parts have been adjusted in position upon the segments F according to the amount of movement it is desired that the outer end of the rack A shall have by means of the handle Z, the parts can be made to clamp opposite sides of the segments, so as to hold them rigidly in position no matter how great the movement of the rack may be.

The dotted lines at various points on the straw-rack in Fig. 1 show the direction of the force or motion which would be imparted to straw placed upon this rack if power were applied to the shaft B. The arrows indicate the direction which would be taken by the straw, and it will be observed that at the revolving shaft the motion is on a circle. A little farther forward the motion is still circular, but slightly elongated. The motion continues circular farther forward, but still more elongated, and toward the bottom becomes almost pointed. At the point where the shaft R is connected with the hollow shaft G by means of the bars Q the motion is upward on a circle and returns on precisely the same line. Beyond this point the direction is reversed, as shown by the arrows, and it is here that the agitating force resembles the operation with the pitchfork hereinafter referred to.

If it is found that the straw remains upon the rack longer than desired, the resisting motion may be moderated by lowering that end of the straw-rack in manner already described, and likewise it may be retained upon the rack longer by elevating the rack, thus increasing the resisting motion. These changes may be readily made while the machine is in motion.

The object of making the outer end of the straw-rack adjustable in this manner is to convey to such straw-rack either greater or less agitating force when the machine is in operation. When the straw to be threshed is heavy or damp, it requires a greater amount of agitation to remove the grain therefrom, and hence as the straw is heavy or damp the supporting-arms Q are adjusted in the segments so as to give the amount of motion necessary to disclose the grain. By raising the outer end of the rack the movement has the same effect upon the straw as is produced in shaking straw upon a pitchfork, the amount of agitation increasing toward the outer end of the tines. This increase is not alone lateral, but is upward, and the action or motion is a peculiar one.

By the construction herein described the throw or agitating force of the rack may be altered or regulated while the threshing-machine is in operation, the desirability of which will be apparent.

Having thus described my invention, I claim—

1. The rack, the cranked driving-shaft to which one end of the rack is connected, and means for driving the shaft, combined with a rod or shaft connected to the under side of the outer end of the rack, supporting-arms loosely connected to said rod or shaft, a rod or shaft for connecting the lower ends of the arms, toothed segments through which the outer ends of the connecting rod or shaft pass, pinions upon the outer ends, and which engage with the toothed segments, and means for holding the connecting rod or shaft in any desired position upon the segments, substantially as described.

2. A rack, and a mechanism for operating it connected to one end, combined with the supporting-arms which are loosely connected with the rack near its outer end, a cross-piece to which the lower ends of the supporting-arms are connected, toothed segments through which the connecting cross-piece extends, and toothed sleeves for turning the cross-piece so as to raise and lower it in the segments, substantially as specified.

3. In a straw-rack, a clamping-rod provided with a head at one end, and a nut at the other, a sleeve placed upon the rod, suitable toothed collars applied to the sleeve, and a handle for causing the sleeve and its attachments to revolve, combined with the toothed segments and the supporting-arms for the outer end of the rack, and which arms are loosely connected to the sleeve, substantially as shown and described.

In testimony whereof I affix my signature in presence of two witnesses.

HENRY W. MEINERT.

Witnesses:
LORENZ PAULSEN,
TH. RECHMANN.